(12) United States Patent
Hirsch

(10) Patent No.: US 8,345,565 B2
(45) Date of Patent: Jan. 1, 2013

(54) METHOD AND SYSTEM FOR OPERATING A WIRELESS ACCESS POINT IN THE PRESENCE OF BURSTY INTERFERENCE

(75) Inventor: Olaf Hirsch, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 295 days.

(21) Appl. No.: 12/523,454

(22) PCT Filed: Jan. 16, 2008

(86) PCT No.: PCT/US2008/051243
§ 371 (c)(1),
(2), (4) Date: Jul. 1, 2010

(87) PCT Pub. No.: WO2008/089293
PCT Pub. Date: Jul. 24, 2008

(65) Prior Publication Data
US 2010/0284381 A1    Nov. 11, 2010

Related U.S. Application Data

(60) Provisional application No. 60/880,656, filed on Jan. 16, 2007.

(51) Int. Cl.
*H04J 1/16* (2006.01)
*H04L 12/56* (2006.01)
(52) U.S. Cl. ............. 370/252; 370/229; 370/329; 455/1
(58) Field of Classification Search .................. 370/252, 370/329, 229; 455/1
See application file for complete search history.

(56) References Cited

U.S. PATENT DOCUMENTS

| | | | |
|---|---|---|---|
| 5,471,647 | A | 11/1995 | Gerlach et al. |
| 5,843,139 | A | 12/1998 | Goedeke et al. |
| 5,887,034 | A | 3/1999 | Suzuki |
| 6,014,412 | A | 1/2000 | Wiese et al. |
| 6,404,830 | B2 | 6/2002 | Wiese et al. |
| 6,449,324 | B2 | 9/2002 | Wiese et al. |
| 6,456,673 | B1 | 9/2002 | Wiese et al. |
| 6,470,047 | B1 | 10/2002 | Kleinerman et al. |
| 6,498,820 | B1 | 12/2002 | Thomson et al. |
| 6,873,653 | B1 | 3/2005 | Rezvani et al. |
| 7,009,515 | B2 | 3/2006 | Carrender |

(Continued)

FOREIGN PATENT DOCUMENTS

WO    2004/027565 A2    4/2004

OTHER PUBLICATIONS

Cioffi J. et al., "Vectored VDSL for Universal Band Allocation (TD16)", Sep. 1999, pp. 1-10, Stanford Univ., USA.

(Continued)

*Primary Examiner* — John Pezzlo

(57) ABSTRACT

A method and system for operating a wireless access point is disclosed. In an embodiment, a wireless access point determines whether bursty interference is present within the operating range of the wireless access point and then adapts a transmission characteristic in response to the determination. In an embodiment, the wireless access point determines whether bursty interference is present by changing at least one transmission characteristic and monitoring the resulting error rates. The presence of bursty interference can be detected if a lowering of the transmission rate causes an increase in the error rate. The increase in the error rate is a result of the lower transmission rate and corresponding longer transmission time for each frame, which in turn increases the likelihood that a frame will overlap with bursty interference.

16 Claims, 3 Drawing Sheets

U.S. PATENT DOCUMENTS

| | | | |
|---|---|---|---|
| 7,027,407 | B2 | 4/2006 | Diepstraten et al. |
| 7,158,563 | B2 | 1/2007 | Ginis et al. |
| 2002/0027985 | A1 | 3/2002 | Rashid-Farrokhi |
| 2002/0054610 | A1 | 5/2002 | Reusens et al. |
| 2002/0101821 | A1 | 8/2002 | Feldmann et al. |
| 2002/0122413 | A1 | 9/2002 | Shoemake |
| 2002/0172166 | A1 | 11/2002 | Arslan et al. |
| 2003/0117995 | A1 | 6/2003 | Koehn et al. |
| 2003/0126492 | A1 | 7/2003 | Cavin |
| 2005/0058151 | A1 | 3/2005 | Yeh |
| 2006/0133543 | A1* | 6/2006 | Linsky et al. ............ 375/341 |
| 2011/0317580 | A1* | 12/2011 | Kozisek et al. .......... 370/252 |

OTHER PUBLICATIONS

Cioffi J. et al., "G.vdsl: Vectored VDSL for Universal Band Allocation", Nov. 1999, 8pp., T.I. ITU—Telecom. Standardization Sector, Nashville TN, USA.

Cioffi J. et al., "Vectored VDSL (99-559)", Dec. 1999, pp. 2-10, Stanford Univ. Dept. of Elec. Eng., USA.

Ginis G. et al., "A multi-user precoding scheme achieving crosstalk cancellation with application to DSL systems.", IEEE 2000, pp. 1627-1631, vol. 2, USA.

* cited by examiner

METHOD AND SYSTEM FOR OPERATING A WIRELESS ACCESS POINT IN THE PRESENCE OF BURSTY INTERFERENCE

This application is entitled to the benefit of provisional U.S. Provisional Patent Application Ser. No. 60/880,656, filed 16 Jan. 2007, which is incorporated by reference herein.

The invention relates generally to wireless communications systems, and more particularly, to operating a wireless access point in the presence of bursty interference.

Wireless access points, such as wireless local area network (WLAN) access points, use rate adaptation to deal with interference. Convention WLAN rate adaptation algorithms are optimized to deal with additive white Gaussian noise (AWGN). A conventional WLAN rate adaptation protocol lowers the transmission rate in response to increased AWGN. The lower transmission rate results in longer transmission times for data frames and decreased error rates.

BLUETOOTH is a short range wireless protocol for personal area networks (PANs). For example, BLUETOOTH is used to wirelessly connect devices such as mobile phones, microphones, laptops, personal computers, printers, digital cameras, and video game consoles. BLUETOOTH transmits data in bursts of radio frequency (RF) signals that are separated by 2.5 millisecond windows of no transmission.

When a BLUETOOTH device is operated in close proximity to WLAN devices, the bursty RF signals from the BLUETOOTH device can interfere with the WLAN communications. As stated above, conventional WLAN rate adaptation protocols tend to lower transmission rates, which results in longer transmission times for the WLAN data frames and a greater likelihood that the transmission of a WLAN data frame with overlap with an RF signal burst from the BLUETOOTH device. Because the longer WLAN data frames are more likely to be transmitted during an RF signal burst from the BLUETOOTH device, conventional WLAN rate adaptation protocols may actually reduce the efficiency of WLAN communications when bursty interference is present.

In accordance with an embodiment of the invention, a wireless access point determines whether bursty interference is present within the operating range of the wireless access point and then adapts a transmission characteristic in response to the determination. In an embodiment, the wireless access point determines whether bursty interference is present by changing at least one transmission characteristic and monitoring the resulting error rates. The presence of bursty interference can be detected if a lowering of the transmission rate causes an increase in the error rate. The increase in the error rate is a result of the longer transmission time for each frame, which increases the likelihood that a frame will overlap with a BLUETOOTH signal burst. Once it is determined that bursty interference is present, such as interference from a BLUETOOTH device, a transmission characteristic used by the wireless access point can be adjusted to be more compatible with the bursty interference. For example, if the source of the bursty interference is a BLUETOOTH device, the transmission rate used by the wireless access point can be selected to produce frames of less than 2.5 ms. Frames of less than 2.5 ms are less likely to overlap with the BLUETOOTH transmissions. In an embodiment, frame transmissions from the wireless access point and/or the wireless station are scheduled to coincide with the windows of no BLUETOOTH transmissions.

Other aspects and advantages of the present invention will become apparent from the following detailed description, taken in conjunction with the accompanying drawings, illustrating by way of example the principles of the invention.

Throughout the description, similar reference numbers may be used to identify similar elements.

Figure 1:
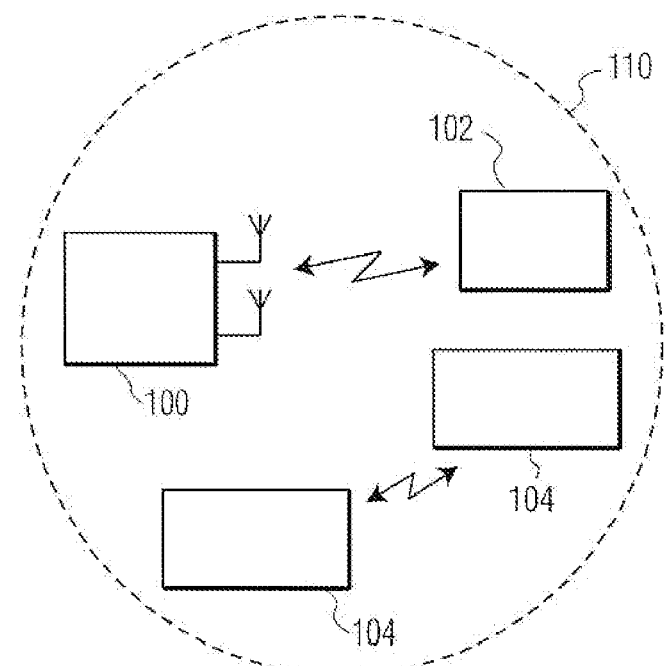
FIG. 1 depicts a wireless access point, a wireless station, and two BLUETOOTH devices that are all present within an operating range of the wireless access point.

FIG. 1 depicts a wireless access point 100, a wireless station 102, and two BLUETOOTH devices 104 that are all present within an operating range 110 of the wireless access point. In an embodiment, the wireless access point is a wireless local area network (WLAN) access point that operates according to a WLAN protocol. For example, the wireless access point operates according to the IEEE 802.11 family of standards, including for example, 802.11a, 802.11b, 802.11g and 802.11n. The wireless access protocol may support other types of wireless protocols including, for example, wireless protocols referred to as WiMax, WiMedia, and Wi-Fi. In an embodiment, the wireless access point is connected to a wired network (not shown) by an optical fiber or twisted pair wire, although this is not required. The operating range of the wireless access point is the range over which the wireless access point is able to wirelessly communicate with the wireless station. The bounds of the operating range are dependent on various factors, including, for example, the transceiver capabilities of the wireless access point and the wireless station and environmental conditions, e.g., electromagnetic interference, physical barriers, multipath fading, weather, etc.

The wireless station 102 is a device that communicates with the wireless access point 100 through RF signals. In an embodiment, the wireless station is a device such as a laptop or desktop computer although the wireless station can be another type of device that can wirelessly communicate with the wireless access point. The wireless station includes a wireless transceiver (not shown) as is known in the field.

The BLUETOOTH devices 104 are any devices that are able to send and/or receive BLUETOOTH-compatible RF signals. For example, the BLUETOOTH devices may include devices such as mobile phones, microphones, laptops, personal computers, printers, digital cameras, and video game consoles. The BLUETOOTH devices transmit data in bursts of RF signals, for example, in bursts that are separated by fixed windows of no transmission, for example, 2.5 millisecond windows of no transmission. Although the BLUETOOTH devices are depicted as being within the operating range 110 of the wireless access point 100, this is not a requirement. However, since BLUETOOTH devices operate over a relatively small operating range, it is likely that only BLUETOOTH devices that are within the operating range of the wireless access point will produce bursty interference that impacts communications between the wireless access point and the wireless station 102.

In accordance with an embodiment of the invention, the wireless access point 100 determines whether bursty interference is present within the operating range 110 of the wireless access point and then adapts a transmission characteristic in response to the determination. In an embodiment, the wireless access point determines whether bursty interference is present by changing at least one transmission characteristic and monitoring the resulting error rates. The presence of bursty interference can be detected if a lowering of the transmission rate causes an increase in the error rate. The increase in the error rate is a result of the longer transmission time for each frame, which increases the likelihood that a frame will overlap with a BLUETOOTH signal burst. Once it is determined that bursty interference is present, such as interference from a BLUETOOTH device, a transmission characteristic used by the wireless access point can be adjusted to be more compatible with the bursty interference. For example, if the source of the bursty interference is a BLUETOOTH device, the transmission rate used by the wireless access point can be selected to produce frames of less than 2.5 ms. Frames of less than 2.5 ms are less likely to overlap with the BLUETOOTH transmissions. In an embodiment, frame transmissions from the wireless access point and/or the wireless station are scheduled to coincide with the windows of no BLUETOOTH transmissions.

Figure 2:
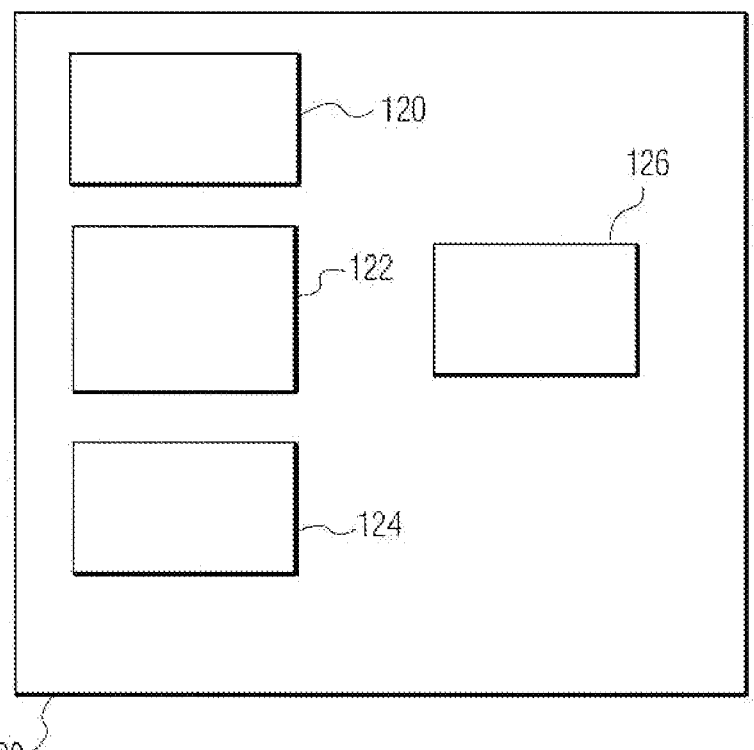
FIG. 2 depicts an embodiment of a wireless access point that includes a data accumulation module, a bursty interference detection module, and a rate adaptation module.

FIG. 2 depicts an embodiment of a wireless access point 100 that includes a data accumulation module 120, a bursty interference detection module 122, and a rate adaptation module 124. The wireless access point also includes a wireless transceiver 126 that facilitates wireless communications between the wireless access point and the wireless station 102 along with additional functional elements (not shown) that are known in the field of wireless access points but not described further herein.

In an embodiment, the data accumulation module 120 is configured to accumulate performance data related to the performance of communications between the wireless access point 100 and the wireless station 102. In an embodiment, the data accumulation module is configured to change a transmission characteristic used by the wireless access point, to monitor an error rate of communications having the changed transmission characteristic, and to accumulate transmission characteristic versus error rate data. In an embodiment, the data accumulation module is further configured to generate a histogram of the transmission characteristic versus error rate data. The accumulated data, for example, the histogram, is then used to determine whether bursty interference is present within the operating range of the wireless access point.

Although only one wireless station 102 is shown in FIG. 1, additional wireless stations may exist within the operating range 110 of the wireless access point 100. Additionally, the data accumulation module may be configured to accumulate performance data related to the performance of communications between the wireless access point and other wireless stations alone or in combination with the wireless station depicted in FIG. 1.

Various different techniques can be used to accumulate performance data from which the presence of bursty interference can be determined. In an embodiment, the wireless access point 100 compares the signal strength and or the physical layer transmission rate (PHY rate) of a received frame and calculates the maximum PHY rate at which the wireless access point could transmit its own frames. A very strong signal received from a wireless station is an indication that the wireless access point could transmit frames at high data rates. If there is a significant difference between the calculated PHY rate and the actual PHY rate, the wireless access point can increase its PHY rate.

In another embodiment, the wireless access point reduces the PHY rate and monitors whether the error rate deteriorates in response to the reduction in the PHY rate. In an embodiment, if this happens, the wireless access point increases the PHY rate again until the error rate deteriorates again.

In another embodiment, the wireless access point keeps track of the error rates for different frame transmission durations. If the wireless access point detects a strong deterioration for longer duration frames, then the wireless access point can adjust the PHY rate such that the longer durations are avoided.

In an embodiment, the wireless access point uses lower PHY rates, the wireless access point will periodically transmit frames at a higher PHY rate. If the wireless access point finds that these higher PHY rates are reducing the packet error rate it can quickly increase the used PHY rates.

In an embodiment, the wireless access point uses special frames such as null frames with additional data to increase the frame duration. Alternatively, the wireless access point can use other frames for which it can control the frame duration. In an embodiment, the special frames are regularly "sprinkled" into the normal data transfers with the wireless station. The wireless access point creates a histogram with the error rates for different durations and uses the histogram to determine if a bursty interferer exists and which would be the longest duration frames that can be transmitted in that environment.

In an embodiment, the wireless access point includes frame fragmentation in its rate adaptation algorithm. Additionally, the wireless access point checks to see if fragmenting frames improves the error rate. If it is found that frame fragmentation improves the error rate, frame fragmentation can be included in the transmission protocol.

Figure 3:
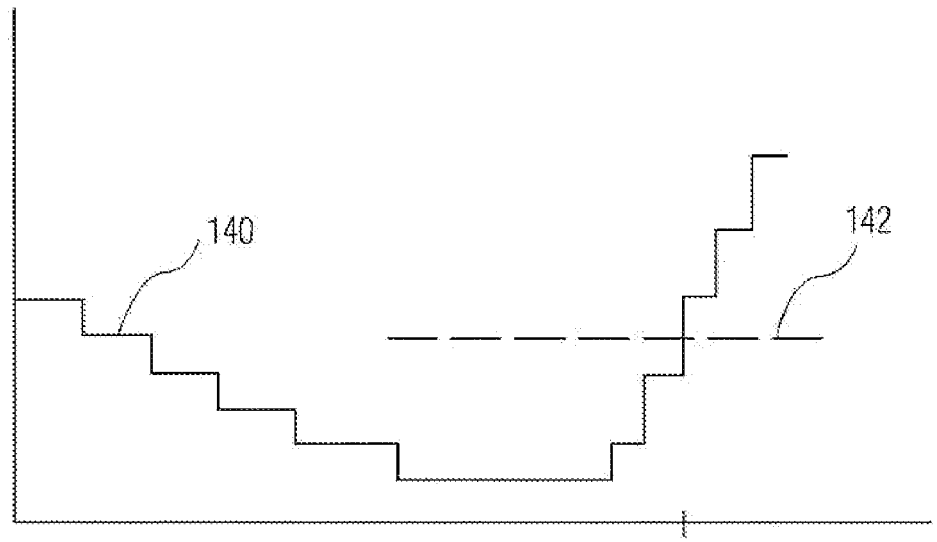
FIG. 3 illustrates a histogram that represents error rate versus frame duration.

In an embodiment, the data accumulation module generates a histogram using the performance data. For example, a histogram is generated from the transmission characteristic versus error rate data. For example, the data accumulation module generates a histogram 140 that identifies the error rate (e.g., bit error rate, packet error rate, etc.) for different durations of frame transmissions. FIG. 3 illustrates a histogram that represents error rate versus frame duration. FIG. 3 also illustrates an error threshold 142 relative to the histogram. In an embodiment, the longest frame duration is determined as a function of the error threshold. For example, the longest frame duration is the frame duration having an error rate that coincides with the error threshold.

In an embodiment, the bursty interference detection module 122 is configured to determine whether bursty interference is present within an operating range 110 of the wireless access point 100. For example, the bursty interference detection module uses the accumulated data from the data accumulation module to determine whether bursty interference is present within an operating range of the wireless access point. In an embodiment, the bursty interference detection module uses a histogram to determine whether bursty interference is present within an operating range of the wireless access point. For example, the presence of bursty interference can be detected if longer transmission durations correspond to an increase in the error rate. Typically, longer transmission durations (e.g., lower PHY rates) result in increased error rates. However, the increase in the error rate that may be experienced with the lower transmission rate (and corresponding longer transmission duration for each frame) is a result of the increased likelihood that a frame will overlap with a BLUETOOTH signal burst.

Therefore, in an embodiment, the accumulated data, for example, the histogram of transmission rate verses error rate, is evaluated to determine if bursty interference is present. A histogram that shows an increase in the error rate with a decrease in the transmission rate (and corresponding longer transmission durations) is a strong indicator of the presence of bursty interference, such as the type that is generated by a BLUETOOTH device. In an embodiment, an error threshold is established at a point that would indicate an increased error rate. If the error rate exceeds the error threshold in a direction in which the transmission duration is increasing, then a determination is made that bursty interference is present.

In an embodiment, the rate adaptation module 124 of the wireless access point is configured to adapt a transmission characteristic used by the wireless access point in response to the determination that is made by the bursty interference detection module. For example, when it is determined that bursty interference is present, the rate adaptation module increases the PHY rate. In an embodiment, the PHY rate is increased to a point at which the error rate drops to a desired level, e.g., to below the error threshold 142.

In an embodiment, the PHY rate used by the wireless access point is adjusted to adapt the wireless access to be more compatible with the bursty interference, e.g., to lower the error rate. In another embodiment, a transmission characteristic of the wireless station can be adapted to be more compatible with the bursty interference.

In an embodiment, the rate adaptation module of the wireless access point is configured to fragment frames so that the transmitted frame-fragments have a shorter duration and are less likely to be impacted by the bursty interference.

Figure 4:
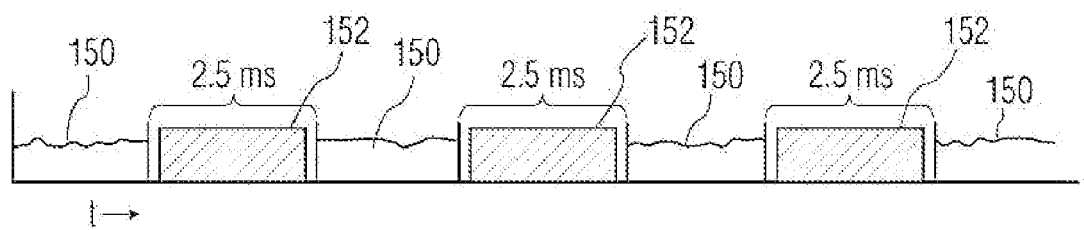
FIG. 4 illustrates bursty interference that includes windows of no transmissions and frames of data from a wireless access point or a wireless station that are transmitted in the windows of no transmission.

In an embodiment, the wireless access point works under the assumption that BLUETOOTH is the main source of bursty interference. Knowing that BLUETOOTH uses a fixed silence period, the wireless access point and/or wireless station can be scheduled to transmit frames in the silence periods. For example, FIG. 4 illustrates bursty interference 150, generated from a BLUETOOTH device, which includes 2.5 ms windows of no transmissions. FIG. 4 also illustrates frames 152 of data, from the wireless access point or the wireless station, that are transmitted in the windows of no transmission.

Some wireless access points use a ready-to-send (RTS)/clear-to-send (CTS) protocol to protect frames from hidden wireless stations. The RTS/CTS protocol does not improve the packet error rates in a bursty interference environment but it can decrease the chances of a successful frame exchange sequence. In an embodiment, the wireless access point is configured to determine if the RTS/CTS protocol improves the error rate of communications between the wireless access point and the wireless station. In an embodiment, if the wireless access point determines that the RTS/CTS protocol does not improve the error rates, then the use of RTS/CTS is stopped.

Figure 5:
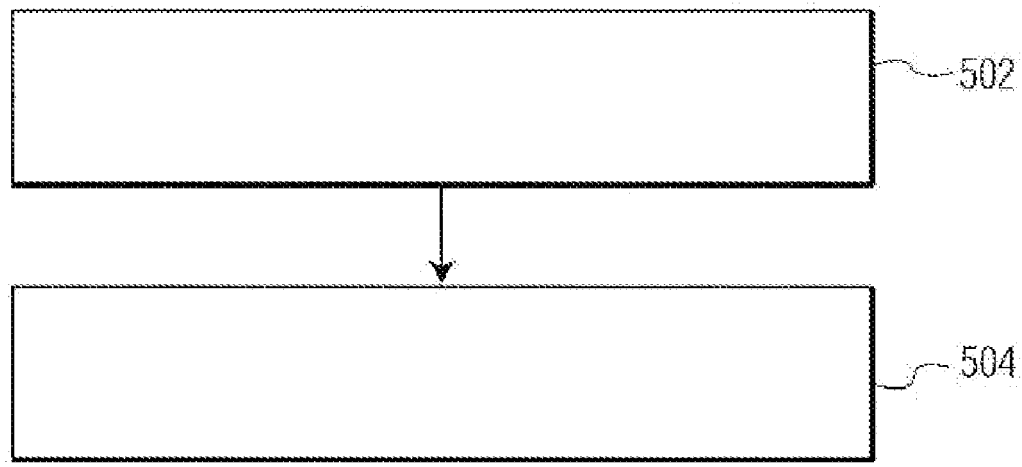
FIG. 5 is a process flow diagram of a method for operating a wireless access point in accordance with an embodiment of the invention.

FIG. 5 is a process flow diagram of a method for operating a wireless access point in accordance with an embodiment of the invention. At block 502, it is determined whether bursty interference is present within an operating range of the wireless access point. At block 504, a transmission characteristic used by the wireless access point is adapted in response to the determination.

Figure 6:
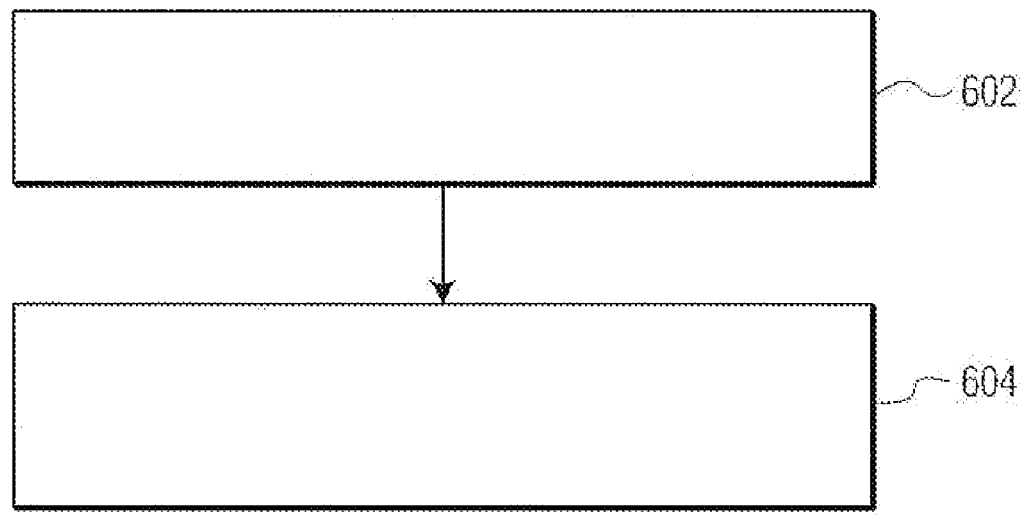
FIG. 6 is a process flow diagram of another method for operating a wireless access point in accordance with an embodiment of the invention.

FIG. 6 is a process flow diagram of another method for operating a wireless access point in accordance with an embodiment of the invention. At block 602, it is determined whether a BLUETOOTH device is present within an operating range of the wireless access point. At block 604, a transmission characteristic used by the wireless access point is adapted to be compatible with the BLUETOOTH device if it is determined that a BLUETOOTH device is present. For example, a transmission characteristic of the wireless access point is selected so the resulting frames have a transmission duration of less than 2.5 milliseconds.

In the embodiment described above, the performance data accumulation, bursty interference detection, and rate adaptation all occur at the wireless access point.

In the embodiment of FIG. 1, the wireless station 102 and the BLUETOOTH devices 104 are depicted as separate devices. However, in another embodiment, the wireless station and one of the BLUETOOTH devices can be physically located in the same device.

Although specific embodiments of the invention have been described and illustrated, the invention is not to be limited to the specific forms or arrangements of parts as described and illustrated herein. The invention is limited only by the claims.

What is claimed is:

1. A method for operating a wireless access point, the method comprising:
using a histogram, indicative of error rate relative to at least one transmission characteristic and therefrom determining whether bursty interference is present within an operating range of the wireless access point; and
adapting a transmission characteristic used by the wireless access point in response to the determination.

2. The method of claim 1 wherein determining whether bursty interference is present within an operating range of the wireless access point comprises accumulating performance data related to performance of communications between the wireless access point and a wireless station and wherein the determination is made in response to the performance data.

3. The method of claim 2 wherein accumulating performance data comprises:
changing a transmission characteristic used by the wireless access point;
monitoring an error rate of communications having the changed transmission characteristic; and
accumulating transmission characteristic versus error rate data.

4. The method of claim 3 further comprising:
generating the histogram using the transmission characteristic versus error rate data; and
using the histogram to determine whether bursty interference is present.

5. The method of claim 3 wherein the accumulated data is used to identify the longest transmission duration of a frame.

6. The method of claim 3 wherein the accumulated data is used to identify the slowest transmission rate.

7. The method of claim 1 wherein the transmission characteristic comprises one of a transmission rate, an amount of data per frame, and fragmenting frames.

8. A method for operating a wireless access point, the method comprising:
determining whether bursty interference is present within an operating range of the wireless access point;
adapting a transmission characteristic used by the wireless access point in response to the determination;
determining if a ready-to-send (RTS)/clear-to-send (CTS) protocol improves an error rate of communications between the wireless access point and a wireless station; and
ceasing use of the RTS/CTS protocol if it is determined that the RTS/CTS protocol does not improve the error rate.

9. A method for operating a wireless access point, the method comprising:
determining whether bursty interference is present within an operating range of the wireless access point; and adapting a transmission characteristic used by the wireless access point in response to the determination, wherein adapting a transmission characteristic comprises selecting a transmission characteristic that results in frames of less than 2.5 milliseconds.

10. A method for operating a wireless access point, the method comprising:
   determining whether bursty interference is present within an operating range of the wireless access point; and
   adapting a transmission characteristic used by the wireless access point in response to the determination, wherein determining whether bursty interference is present within an operating range of the wireless access point comprises accumulating performance data related to the performance of communications between the wireless access point and a wireless station and wherein the determination is made in response to the performance data; and
   wherein accumulating performance data comprises:
   changing a transmission rate used by the wireless access point;
   monitoring an error rate of communications having the changed transmission rate; and
   accumulating transmission rate versus error rate data.

11. The method of claim 10 further comprising:
   generating a histogram using the transmission rate versus error rate data; and
   using the histogram to determine whether bursty interference is present.

12. The method of claim 11 wherein the histogram is used to identify the slowest transmission rate that is above an error threshold.

13. A wireless access point comprising:
   a bursty interference detection module configured to determine whether bursty interference is present within an operating range of the wireless access point by using a histogram, indicative of error rate relative to at least one transmission characteristic; and
   a rate adaptation module configured to adapt a transmission characteristic used by the wireless access point in response to the determination that is made by the bursty interference detection module.

14. A wireless access point comprising:
   a bursty interference detection module configured to determine whether bursty interference is present within an operating range of the wireless access point by using a histogram, indicative of error rate relative to at least one transmission characteristic;
   a rate adaptation module configured to adapt a transmission characteristic used by the wireless access point in response to the determination that is made by the bursty interference detection module; and
   a data accumulation module configured to accumulate performance data related to the performance of communications between the wireless access point and a wireless station and wherein the bursty interference determination module is configured to make the determination in response to the performance data.

15. The system of claim 14 wherein the data accumulation module is configured to:
   change a transmission characteristic used by the wireless access point;
   monitor an error rate of communications having the changed transmission characteristic; and
   accumulate transmission characteristic versus error rate data.

16. The system of claim 15 wherein the data accumulation module is further configured to generate a histogram using the transmission characteristic versus error rate data and wherein the bursty interference detection module is further configured to use the histogram to determine whether bursty interference is present.

* * * * *